May 2, 1950   S. R. THOMAS ET AL   2,506,525
BEARING ASSEMBLY

Filed Jan. 17, 1947   2 Sheets-Sheet 1

Inventors
Stanley R. Thomas
Leo A. Toth
By Walter E. Schirmer
Atty.

May 2, 1950　　　S. R. THOMAS ET AL　　　2,506,525
BEARING ASSEMBLY

Filed Jan. 17, 1947　　　　　　　　　　　　2 Sheets-Sheet 2

Inventors
Stanley R. Thomas
Leo A. Toth
By Walter E. Schirmer
Atty.

Patented May 2, 1950

2,506,525

UNITED STATES PATENT OFFICE 2,506,525

BEARING ASSEMBLY

Stanley R. Thomas, Lyons, Mich., and Leo A. Toth, South Bend, Ind., assignors to The Torrington Company, South Bend, Ind., a corporation of Indiana Application January 17, 1947, Serial No. 722,618

6 Claims. (Cl. 308—207)

This invention relates to bearing assemblies and more particularly is concerned with a bearing assembly for use in supporting the roll necks of the rolls used in rolling mills and the like.

One object of the present invention is to provide a bearing assembly for roll necks of this type in which a self-aligning spherical roller type bearing is employed to accommodate the deflections of the roll neck caused by the corresponding deflection of the rolls and a second roller bearing assembly, mounted at each side of the supporting bearing pedestal for accommodating axial movement of the roll neck.

In the present invention, the latter bearing assembly comprises a cage, roll and roller plate unit which is mounted on either side of the bearing housings and becomes what might be considered part of the ladder bearing with the intermediate rolls and sleeve pockets removed. There is provided a spring on either side of the retaining screw which supports the roller plate assembly in position relative the bearing housing and is utilized to keep the cage and rollers in correct relationship until the rollers are loaded and the entire housing is in operating position.

Another object of the present invention is to provide a roller assembly and bearing construction for a roll neck which will accommodate floating of the bearing and housing during shaft deflection and take care of axial travel of the roll. In the present construction, the bearing housing is stabilized by the roller bearings upon which it is supported so that it can move axially and the self-aligning spherical roller bearing is used about the roll neck to take care of deflection.

Another object of the present invention is to provide a bearing assembly possessing these characteristics which is considerably cheaper than the construction in which a complete ladder bearing is provided.

A still further advantage secured by the present construction is to provide one piece cage, roller and roller plate assemblies on each side of the bearing housings which can be manufactured at relatively low cost and which eliminate considerable machining of adjacent parts which would be necessary if two short roll assemblies were employed on each side of the housing. Such construction would also require the use of spacers which is accommodated in the present construction by making a unitary plate assembly which provides for positive spacing of the rollers without the necessity of any additional pieces.

Other objects and advantages of the present construction will be more apparent from the following detailed description, which, taken in conjunction with the accompanying drawings, will disclose to those skilled in the art, the particular construction and operation of a preferred form of the present invention.

Figure 1:
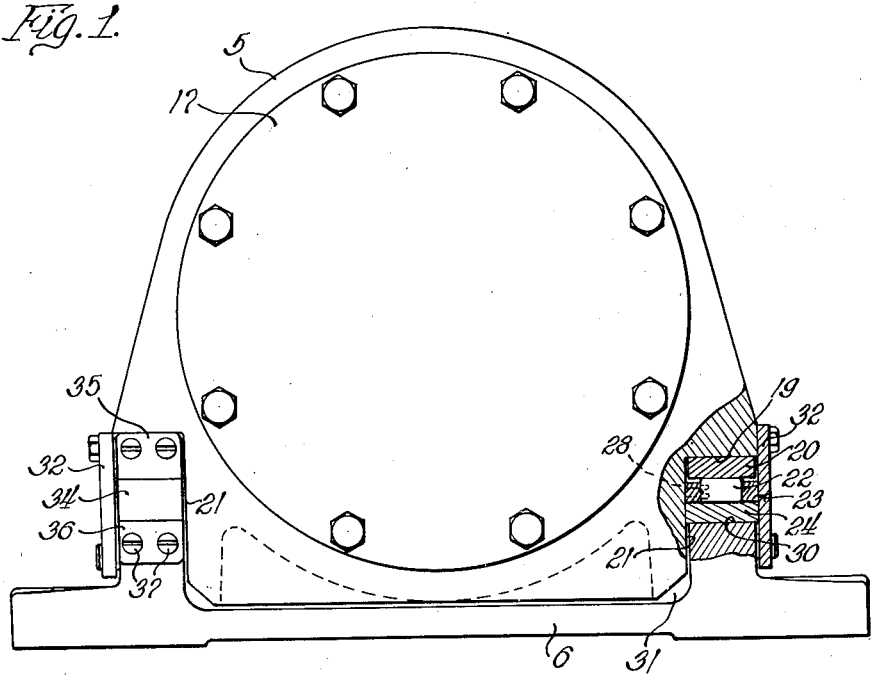
Figure 1 is an end elevational view of a bearing housing and assembly for the roll neck of a roller employing the present invention.

Referring now in detail to the drawings, there is provided the bearing housing 5 which housing is supported upon a pedestal or supporting member 6, the bearing housing 5 being adapted to contain a bearing assembly 7 which consists of the outer bearing race 8 located in the housing 5, the inner bearing race 9 mounted upon the reduced portion, indicated generally at 11, of a roll neck 12, and a double row of spherical rollers 13 contained within the bearing cage 14.

This bearing assembly 7 is of the conventional self-aligning double spherical roller bearing construction and provides a construction which accommodates deflection of the roll neck 12 caused by bending of the roll. The housing 5 includes a side plate 10 which is provided with a suitable lubricant seal indicated generally at 15 at the end of the housing where it surrounds the roll neck 12. The opposite end of housing 5 has an enclosing end plate 17 bolted thereto enclosing the roll neck and bearing assembly. The inner race of bearing assembly 7 is held in position upon the reduced end of the roll neck by means of plate 16 bolted to the end of the shaft and forcing the inner race against the thrust washer 18.

Figure 2:
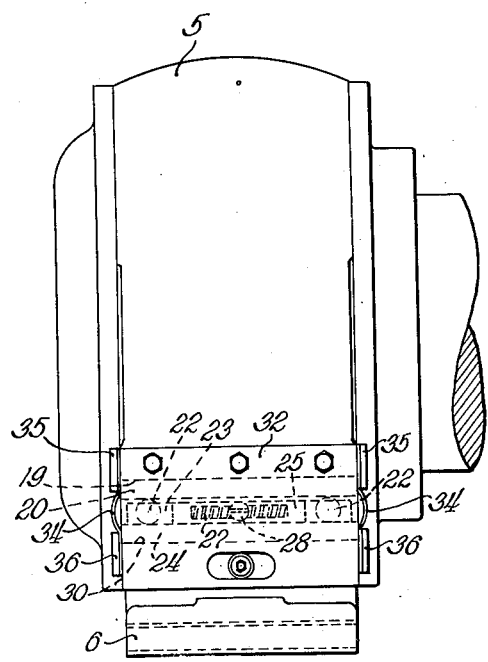
Figure 2 is a side elevation of the structure shown in Figure 1.
Figure 3:
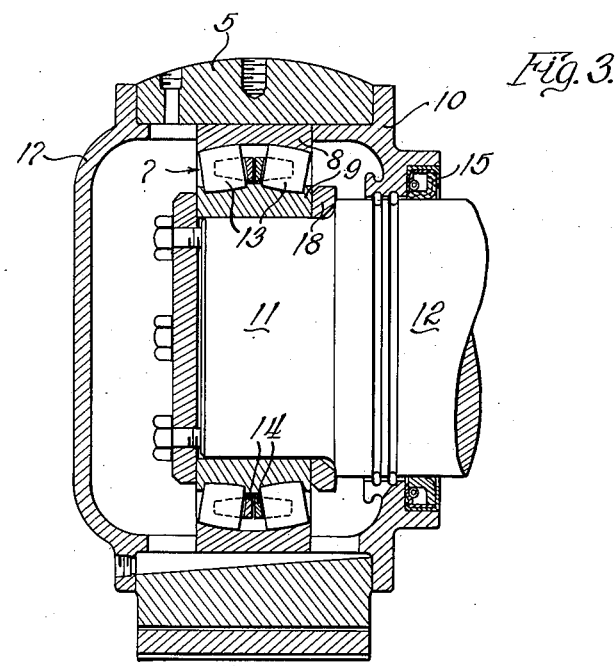
Figure 3 is a sectional view of the structure shown in Figure 1.

The base portion of the supporting housing 5 is provided at opposite sides thereof with longitudinally directed recessed portions 19 defined at their inner edges by vertical walls 21 by which the assembly may be guided into the recess 31 formed in the supporting base 6. This allows easy location of the bearing assembly in its support. The surfaces 19 each receive a bearing plate 20 extending longitudinally along the upper face of the recess as shown in Figure 2. The plates 20, in turn, are adapted to rest upon the straight roller members 22 carried within a cage assembly, indicated generally in Figure 4 at 23, and mounted upon the roller plate 24. The rollers 22 are secured within suitable recesses in the cage 23.

Figure 4:
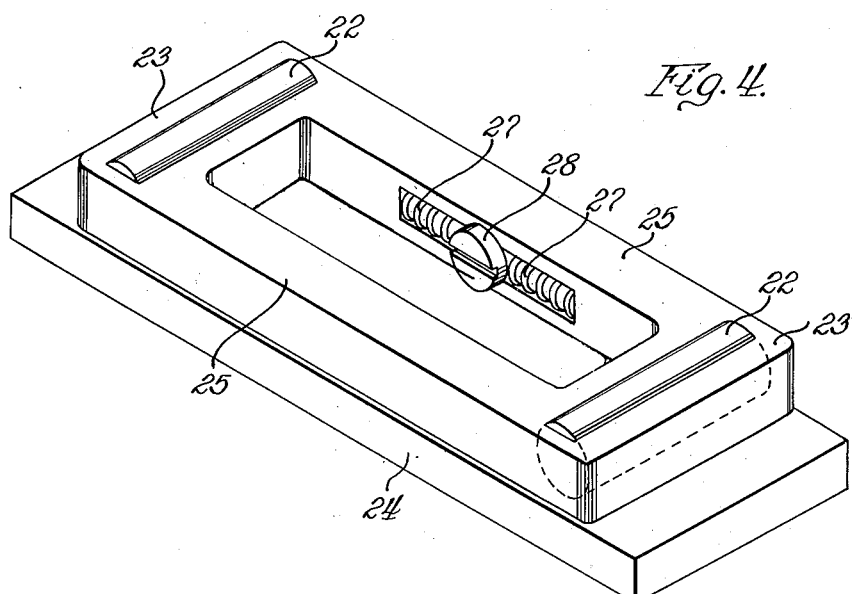
Figure 4 is an isometric view of the roller cage and lower plate of the assembly shown in Figures 1 and 2.

The cage assembly also preferably includes longitudinally extending portions 25 which are joined to the transversely extending ends containing the rollers 22, as clearly shown in Figure 4. Intermediate the roller pockets, the member 25 is suitably apertured to receive oppositely disposed coil springs 27 which are separated by means of the retaining screw 28. The retaining screw 28 is adapted to be screwed into a suitably tapped opening formed in the vertically extending walls of the recesses 19 formed in the member 5. To initially locate the assembly 23 in position, the springs 27 function to center this assembly relative to the retaining screw 28 and to locate it in position until the rollers are loaded within the assembly.

One such assembly is located on either side of the member 5 and it will be noted that by the position of the rollers in the manner noted, the entire assembly including the bearing housing 5 for the self-aligning bearing assembly 7, is free to travel axially relative to the axis of the roll thereby accommodating expansion and contraction of the roll necks axially while the self-aligning bearing accommodates deflection of the roll.

The roll assembly 23 has lower plate 24 thereof resting upon a supporting surface 30 formed integrally upon the supporting base 6. This provides a flat fixed support for the assembly 23 to maintain accurate positioning of the assembly relative the supporting member 6 and to provide that the axis of the two rollers 22 will be maintained in the same horizontal plane and will be located such as to accommodate straight axial movement of the assembly supported thereon.

Preferably suitable dust covers 34 are provided at opposite ends of the assembly and are secured at their ends respectively as by means of supporting plate 35 to the member 5 and supporting plate 36 to the member 6. The dust plates are preferably screwed into position as by means of the screws 37 and serve to protect the assembly 23 against the entrance of dust, foreign particles, or the like which might be injurious to the rollers 22.

Suitable side plates 32 enclose the sides of the opening receiving the bearing plate assembly and are secured in position in any suitable manner to the housing 5 and slidable base 6 due to the slotted openings 33 in the plates. With this type of assembly, by removing the dust covers and side plates 32, it is possible to lift the entire assembly out of the supporting base 6 with the bearing assembly 23 and plate 20 remaining secured to the bearing housing 5. This facilitates inspection and maintenance of the bearings. The side plates, when in operation, provide means for lifting the complete assembly with the base and prevent lifting of housing 5 from base 6. The slots 33 provided in these plates permit axial movement of housing 5 relative to the base 6.

It will therefore be seen that with the present construction, the roll neck 11 is supported for axial movement by the entire assembly being carried upon the rollers 22 on opposite sides thereof, four rollers thus being provided to produce a firm and planar support for this axial movement. Deflection of the rolls which produces corresponding cocking of the roll neck is accommodated by means of the self-aligning spherical roller bearing assembly 7.

It is believed that the present construction provides a simple way of supporting the roll neck for axial movement by means of a unitary assembly which can be secured in position and can be located in position by the retaining screw 28 until such time as the rollers 22 are loaded after which the springs perform no particular function inasmuch as the plate 24 is then located thereby holding the rollers 22 in their respective relative positions.

We are aware that various changes may be made in certain details of the present construction, and we therefore do not intend to be limited except as defined by the scope and spirit of the appended claims.

We claim:

1. In a roll neck bearing assembly, a self-aligning spherical roller bearing about said neck, a bearing housing therefor, and supporting means for said housing comprising a fixed stand, a pair of rollers arranged on said stand on opposite sides of said neck, and bearing plates on said housing engaging said rollers and movable thereon in accordance with axial movement of said roll neck.

2. Supporting means for a roll neck comprising a self-aligning roller bearing assembly about said neck, a supporting housing for said bearing assembly having opposed laterally offset arms terminating in horizontal surfaces parallelling the axis of said roll neck, a supporting base having corresponding surfaces spaced below said housing surfaces, and unitary flat roller plate assemblies between said surfaces including longitudinally spaced transverse rollers for transmitting the load from said housing to said base and accommodating axial movement of said roll neck and housing.

3. The structure of claim 2 including spring loaded anchoring means for initially locating said roller assemblies in position prior to loading of said rollers.

4. In a roll neck supporting structure, a self-aligning bearing surrounding said neck, a housing for said bearing having axially extending supporting legs at opposite sides of the housing provided with horizontal supporting surfaces, a cage, roller and roller plate unit assembly secured to said housing adjacent each of said legs with transverse rollers therein engaging said surfaces, and supporting base means beneath said housing having aligned surfaces on opposite sides of said housing receiving and supporting said plates of said unit assemblies.

5. The structure of claim 4 including spring-centered anchoring means for securing each of said unit assemblies to said housing.

6. The structure of claim 4 including means preventing vertical movement of said housing relative to said base during operation, and means accommodating axial movement of said housing with respect to said base.

STANLEY R. THOMAS.
LEO A. TOTH.

REFERENCES CITED

The following references are of record in the file of this patent:

UNITED STATES PATENTS

| Number | Name | Date |
|---|---|---|
| 1,898,273 | Stevens | Feb. 21, 1933 |
| 2,138,601 | Herrmann | Nov. 29, 1938 |